United States Patent Office 3,459,584
Patented Aug. 5, 1969

3,459,584
ARTICLES PRIME COATED WITH POLYESTERS CONTAINING FREE CARBOXYL GROUPS
John R. Caldwell, Kingsport, Tenn., assignor to Eastman Kodak Company, Rochester, N.Y., a corporation of New Jersey
No Drawing. Filed May 2, 1966, Ser. No. 546,556
Int. Cl. B44d 1/36, 1/28; C08d 13/16
U.S. Cl. 117—72    15 Claims

ABSTRACT OF THE DISCLOSURE

Polyesters containing free carboxyl groups are useful as prime coating compositions.

---

This invention relates to novel prime coating compositions made of polyesters containing free carboxyl groups, and, more particularly, it relates to coated substrates employing these polyesters as the coating composition and to the preparation of such coated substrates.

The novel prime coating composition of this invention has as its principal ingredient a carboxylated polyester which is prepared by reacting certain low molecular weight hydroxyl-terminated polymers with a tetracarboxylic acid dianhydride. When one or more of these carboxylated polyesters is dissolved at a suitable concentration in a solvent, the resulting composition is a valuable prime coating composition for use on a wide variety of substrates.

It is an object of this invention to provide a novel prime coating composition.

It is another object of this invention to provide a novel prime coating composition based on polyesters containing free carboxyl groups.

It is another object of this invention to provide novel combinations of substrates prime coated with a solution of carboxylated polyesters.

It is still another object of this invention to provide a combination of a substrate prime coated with a carboxylated polyester composition and top coated with any of a wide variety of coating compositions.

Still other objects will be apparent from the more detailed description of this invention which follows.

Certain aspects of the foregoing objects are accomplished in accordance with this invention by providing a prime coating composition which comprises a solution of a carboxylated polyester consisting essentially of repeating units of the formula:

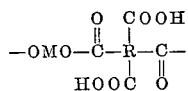

and having about 1.2 to about 15 weight percent free carboxyl groups dissolved in a solvent for said polyester. In the foregoing formula, M is the residue of a hydroxyl-terminated polyester or a poly(ether glycol) having a molecular weight of about 400 to about 8000, R is a tetravalent organic radical.

In an especially preferred embodiment of my invention R is a tetravalent organic group free of olefinic unsaturation containing 4 to about 40 carbon atoms and corresponding to the residue of a tetracarboxylic acid dianhydride. Typical of the tetracarboxylic acid dianhydrides from which the tetravalent group R is derived are those which can be represented by the formula:

(a) 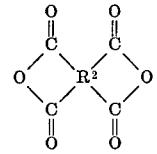

or (b) 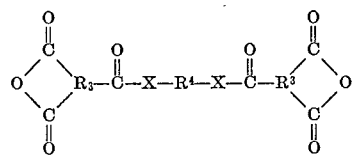

in which $R_3$ is a tetravalent organic radical of 4 to 15 carbon atoms, $R_2$ is a trivalent carbocyclic radical of 6 ring carbon atoms, $R_3$ is a divalent aliphatic radical of 2 to 8 carbon atoms and X is oxygen or imino. Tetracarboxylic acid dianhydrides of the Formula (b) are disclosed in U.S. Patents 3,182,073; 3,182,074; and 3,183,248.

Certain other aspects of the foregoing objects are accomplished in accordance with this invention by providing a coated substrate in which the substrate is selected from the group consisting of: metal, wood, paper, cellulose ethers, cellulose esters, and synthetic polymeric materials. The substrate is coated with the solution of a polyester described above as a prime coating composition and the prime coated substrate is top coated with a material which is different from that of the substrate and is selected from the group consisting of: cellulose esters, cellulose ethers, vinyl polymers, acrylic polymers, polyesters, polycarbonates, polyolefins, styrene polymers, polyamides, polyesteramides, polyureas, polyurethane, poly(phenyleneoxides), polysulfones, polyethers, polyacetals, and waxes.

One of the two principal reactants employed in preparing the carboxylated polyester of this invention is a hydroxyl-terminated polymer having a molecular weight of 400 to 8000. This hydroxyl-terminated polymer can be represented by the formula, HOMOH in which M is as hereinbefore defined and is either a hydroxyl-terminated polyester of a poly(ether glycol). The hydroxyl-terminated polyester may be prepared by the condensation of any of a wide variety of dicarboxylic acids with any of a wide variety of glycols, or alternatively, it may be prepared by the self-condensation of hydroxy acids. Copolyesters may also be employed in this invention and these materials are made by employing two or more dicarboxylic acids, two or more glycols, or two or more hydroxy acids in the condensations just mentioned.

The glycols, which may be employed to prepare the hydroxyl-terminated polyesters may have an aliphatic or aromatic structure. The preferred glycols are the saturated alkylene glycols having 2–20 carbon atoms per molecule and the saturated polyoxyalkylene glycols having 2–30 repeating oxyalkylene groups, each group of which having 2–4 carbon atoms. In certain embodiments of this invention, glycols having ethylenic unsaturation may be employed, e.g., when cross-linking sites are desired in the final product, but usually it is preferred to employ saturated glycols so as to eliminate the possibility of premature cross-linking. Among the aliphatic glycols which may be conveniently employed are: ethylene glycol; 1,2-propanediol; 1,3-propanediol; 2,2-dimethyl-1,3-propanediol; 1,3-butanediol; 1,4-butanediol; 2,3-butanediol; 2-methyl-1,4-butanediol; 1,5-pentanediol; 2,2,4-trimethyl - 1,3 - pentanediol; 1,5-hexanediol; 2-ethyl-1,3-hexanediol; 3-methyl-1,6-hexanediol; the higher polymethylene glycols having 2–20 carbon atoms per molecule; and any of the corresponding branched chain glycols, secondary glycols, and the like. Among the aliphatic glycols which are useful are cycloalkane glycols such as: 1,2-cyclohexanedimethanol; 1,2 - dihydroxycyclohexane; 1,3-cyclohexanedimethanol; 1,3 - dihydroxycyclohexane; 1,4-cyclohexanedimethanol; 1,4 - dihydroxycyclohexane; the various norcamphanediols; the norcamphanedimethanols; and the like. Among the aromatic glycols may be mentioned the alpha,alpha'-dihydroxyxylenes, dibenzyl alcohol and the like.

The dicarboxylic acids which may be employed to prepare the hydroxyl-terminated polyester may also be aliphatic or aromatic. Typical aliphatic dicarboxylic acids are: malonic acid, succinic acid, glutaric acid, adipic acid, pimelic acid, suberic acid, azelaic acid, sebacic acid and any of the polymethylene dicarboxylic acids having 3–20 carbon atoms per molecule. Branched chain aliphatic dicarboxylic acids are also operable in this invention and, therefore, include compounds such as: dimethyl malonic acid, ethyl succinic acid, 2,2-dimethylsuccinic acid, 2-methyladipic acid and the like. The aliphatic dicarboxylic acids which may be employed also include cycloalkane dicarboxylic acids such as: 1,2-cyclohexanedicarboxylic acid; 1,3-cyclohexanedicarboxylic acid; 1,4-cyclohexanedicarboxylic acid; and similar cyclopentanedicarboxylic acids or bicycloalkane dicarboxylic acids such as norcamphanedicarboxylic acid. Aromatic acids which are suitable for the purposes of this invention include: phthalic acid, isophthalic acid, terephthalic acid, 3-chloroisophthalic acid; homophthalic acid; and the various naphthalenedicarboxylic acids. Another type of acid which may be employed for this purpose is one having one or more ether groups. Representative of such acids are diglycolic acid; 3,3'-oxydipropionic acid; and p-phenylenedioxydiacetic acid.

Another source of dicarboxylic acid for use in this invention is the dimer of a fatty acid, such as the dimerized oleic acid and dimerized linoleic acid.

As mentioned above, the polyester may be prepared by the self-condensation of hydroxy acids. Typical of such compounds are: glycolic acid, lactic acid, hydroxypivalic acid, hydroxyacetic acid, 6-hydroxyhexanoic acid, 4-hydroxymethylcyclohexanecarboxylic acid, and the like.

The hydroxyl-terminated polyester is prepared by reacting one or more of the above acid materials with one or more of the above glycols in such a fashion that the product has hydroxyl groups on the terminal positions of the polymer chain. Well-known methods may be employed to assure the presence of hydroxyl groups at these terminal positions. One method is to employ a deliberate excess of glycol in the initial condensation reaction used to prepare the polyester. An alternate procedure is to heat a preformed polyester in the presence of a glycol to change any terminal acid groups to hydroxyl groups. The hydroxyl-terminated polyester should have a molecular weight in the range of 400 to 8000.

The poly(ether glycol) useful in preparing the carboxylated polyesters useful in my invention typically contains from 2 to 4 carbon atoms between the ether groups and contains sufficient repeating units to provide a poly(ether glycol) having a molecular weight of about 400 to about 8000. Typical of the poly(ether glycols) useful in preparing the carboxylated polyesters used in my invention are:

| polyethylene glycol | $HO(C_2H_4O)_{n'}H$ |
| polypropylene glycol | $HO\left(\begin{array}{c}CHCH_2O\\|\\CH_3\end{array}\right)_{n'}H$ |
| poly (1,3-propylene glycol) | $HO(CH_2-\underset{\underset{CH_3}{\|}}{\overset{\overset{CH_3}{\|}}{C}}-CH_2-O)_{n'}H$ |
| poly (1,2-butylene glycol) | $HO\left(\begin{array}{c}CHCH_2O\\|\\C_2H_5\end{array}\right)_{n'}H$ |
| poly (1,4-butylene glycol) | $HO(C_4H_8O)_{n'}H$ | in which $n'$ is typically from 4 to 100 and is sufficiently large to provide a poly(ether glycol) having a molecular weight of about 400 to about 8000.

The hydroxyl-terminated polyester or poly(ether glycol), as described above, is reacted with a tetracarboxylic acid anhydride to produce the carboxylated polyester useful in this invention. The reaction is carried out at a temperature of about 100°–220° C. The reaction may be carried out in solution in which all reactants are dissolved in a suitable inert solvent or the reaction may be carried out by merely mixing the reactants at the proper temperature. Suitable solvents for a solution reaction include materials such as: toluene, xylene, chlorobenzene, cresol, diphenyl, diphenyl ether, chlorinated diphenyl, gamma-butyrolactone, and cyclohexanone. The reaction may require as little as a few minutes to as much as a few hours to reach completion depending upon the temperature and the nature of the reactants, although, in most instances, a reaction time of about 10 minutes to about two hours will be sufficient.

The substrates which are prime coated by the composition of this invention include a wide variety of materials such as: metal, wood, paper, cellulose ethers, cellulose esters, and many synthetic polymeric materials. Any of the metals which are commonly used in the construction of buildings and articles and the like may be prime coated by the composition of this invention. Illustrative of such metals are: iron, steel, brass, aluminum, bronze, zinc, nickel, chromium, magnesium, lead, copper, titanium, gold, silver, and the alloys of such metals. Among the resinous or plastic materials which can be prime coated by the composition of this invention are: cellulose esters, cellulose ethers, vinyl polymers, acrylic polymers, polyesters, polycarbonates, polyolefins, styrene polymers, polyamides, polyesteramides, polyureas, polyurethanes, poly(phenyleneoxides), polysulfones, polyethers, polyacetals, and waxes of various types. Of course, in addition to these materials other commonly used substrates may be employed with the prime coating compositions of this invention such as: wood, paper, textile fabrics, glass, concrete, ceramic materials, and the like.

The prime coating composition of this invention is prepared by dissolving the carboxylated polyester described previously in any of a variety of solvents at a suitable concentration. Among the suitable solvents are the halogenated hydrocarbons, such as, perchloroethylene and chloroform, acetonitrile methyl ethyl ketone, butyl acetate, mixtures of toluene and aliphatic alcohols, and blends of these various materials. The concentration of the polyester in the solution may be any convenient amount depending upon the type of coating to be applied and upon the method of applying that coating. If the solution is to be spread on the substrate, a higher viscosity of solution and therefore a higher concentration of polyester may be employed. If on the other hand, the solution is to be sprayed on the substrate, it may be desirable to employ a lower concentration of solution so as to obtain a lower viscosity. In general, the range of concentrations will vary from about 2% to about 20% by weight of the total solution with the preferred concentration varying from about 5% to about 15%.

Substrates prime coated with the composition of this invention are particularly receptive to a wide variety of top coats. These may be applied in the common methods of spraying, painting, spreading and the like from solutions of the top coating material or alternatively the top coating material may be applied as a molten composition, as particles from a fluidized bed, or by other methods in which there is no solvent present. Illustrative of materials which may be employed as the top coating composition are the cellulose esters, such as, cellulose acetate, cellulose triacetate, cellulose propionate, cellulose acetate butyrate, cellulose caprate, and cellulose nitrate; cellulose ethers, such as ethyl cellulose, benzyl cellulose, and methyl cellulose; vinyl polymers, such as, the homopolymers and copolymers of vinyl acetate, vinyl chloride, vinylidene chloride, vinyl ethers, vinyl acetals, vinyl fluorides, and vinyl alcohol; acrylic polymers, such as, the homopolymers and copolymers of the alkyl, cycloalkyl, and phenyl esters of acrylic and methacrylic acids, the amides and N-substituted amides of acrylic and methacrylic acids, and the nitriles of acrylic and methacrylic acids; polyesters, such as, those made from the condensation of dicarboxylic acids and glycols, the self-condensation of hydroxy acids, the condensation of bisphenols with dicarboxylic acids, and the condensation of bisphenols with disulphonic acids; polycarbonates; polyolefins, such as, polyethylene, polypropylene, polybutylene, polyisobutylene, poly(2-methyl-4-pentene), poly(vinylcyclohexane), poly(allylbenzene), and copolymers of such olefins with other ethylenically unsaturated materials; styrene polymers, such as, polystyrene, poly(alpha-methylstyrene), and polychlorostyrene; polyamides; polyesteramides; polyureas; polyurethanes; poly(phenylene oxides); polysulfones; polyethers; polyacetals; and waxes, such as petroleum waxes, paraffin waxes, microcrystalline waxes, degraded or oxidized polyethylene, maleated polyethylene, beeswax, carnauba wax, and the like. It is to be understood that the foregoing list of materials is merely illustrative of those which might be employed as top coatings for the composition of this invention since with few exceptions substantially any resinous or polymeric composition will adhere to the prime coating composition of this invention.

This invention may be more fully understood by reference to the following illustrative examples which are intended to describe certain embodiments of this invention but are not intended to restrict the scope of the invention in any manner whatsoever. Parts and percentages are by weight and temperatures are in degrees centigrade unless otherwise specified.

EXAMPLE 1

A polyester having a molecular weight of approximately 2,000 was made from 0.5 mole terephthalic acid, 0.5 mole isophthalic acid, and tetramethylene glycol. The ester was terminated with hydroxyl groups. One molecular proportion of the polyester was heated with one molecular proportion of pyromellitic acid dianhydride at 160°–190° C. for several hours. The product contained free carboxyl groups located at intervals along the chain.

One gram of the polyester was dissolved in a mixture of 60 parts perchloroethylene and 40 parts acetonitrile. Cellulose acetate butyrate sheet, wood, and aluminum were dipped into the solution and the solvent was evaporated. The coating had excellent adhesion to the substrates and was an excellent primer for a variety of top coats.

A polyester having the composition 0.95 mole carbonic acid, 0.05 mole isophthalic acid, and 1.0 mole 2,2,4,4-tetramethyl-1,3-cyclobutanediol was dissolved in benzene and the solution was applied to primed and unprimed cellulose acetate butyrate sheeting and aluminum. The adhesion was tested by the "Scotch Tape" test. The coating was not removed from the primed samples but it was completely removed from the unprimed samples. These results showed that the carboxylated polyester had strong adhesion for the substrates and also for the top coat.

EXAMPLE 2

A polyester having a molecular weight of about 1,500 was made from 0.5 mole isophthalic acid, 0.5 mole adipic acid, and 1,4-cyclohexanedimethanol. It was heated with a molar equivalent amount of pyromellitic dianhydride until the terminal hydroxyl groups had substantially completely reacted. The product was soluble in chloroform and in 90 toluene-10 alcohol.

A 10% solution of the carboxylated polyester was coated on aluminum and steel and the solvent was evaporated. A solution of cellulose acetate butyrate was applied on the coated metals and also on strips of the uncoated metals. When tested by the tape method, the cellulose ester coating was not removed from the metals that had been primed with the carboxylated polyester but it was completely stripped from the unprimed surfaces.

Bisphenol A polycarbonate was coated on steel and on steel that had been primed with the carboxylated polyester. When tested by the tape method, the polycarbonate was completely stripped from the unprimed steel but was not removed from the primed steel surface.

EXAMPLE 3

A polyester having a molecular weight of about 3,000 and terminated with hydroxyl groups was made from 0.5 mole terephthalic acid, 0.5 mole isophthalic acid, and 2,2-dimethyl-1,3-propanediol. It was heated with an equal molar amount of pyromellitic dianhydride to form the long-chain, carboxylated polyester. The product was soluble in chloroform, methyl ethyl ketone, butyl acetate, and 90 toluene-10 butyl alcohol.

A 10% solution of the polyester in chloroform was coated on steel, aluminum, and copper. After the solvent was evaporated, a top coat of Bisphenol A polycarbonate was applied from methylene chloride solution. The polycarbonate coating was not removed by the tape test. The adhesion was retained even after the copper strip was sharply bent. This coating is especially valuable for electrical insulation. Excellent adhesion was also obtained with a coating made from norbornylidene diphenol polycarbonate. Both of the above polycarbonates were easily stripped away when coated on the unprimed metals.

Copper, aluminum, and steel primed with the carboxylated polyester had excellent adhesion for the following top coats: poly(methylmethacrylate), polystyrene, cellulose acetate, cellulose triacetate, cellulose acetate butyrate, poly(vinylchloride acetate), poly(ethyleneisophthalate), and a polyester made from 0.6 mole isophthalic acid, 0.4 mole terephthalic acid, and Bisphenol A. Poly(vinylbutyral) and high viscosity poly(vinylacetate) also had good adhesion on the primed metals.

This carboxylated polyester had excellent adhesion on other substrates such as nylon, zinc, brass, phenol-formaldehyde resins, cellulose nitrate, acrylic fibers, and paper.

The carboxylated polyester is particularly useful as a primer for objects that are to be coated by the fluidized bed process. For example, an iron or aluminum object is dipped into a solution of the polyester and the solvent is evaporated. It is then heated and passed through a fluidized bed of cellulose ester, nylon, a vinyl polymer, or an acrylic polymer. The coatings have excellent adhesion.

EXAMPLE 4

A polyester having a molecular weight of about 1,600 was made from 0.3 mole isophthalic acid, 0.7 mole 1,4-cyclohexanedicarboxylic acid (mixed isomers), and tetramethylene glycol. It was heated with a molar equivalent amount of pyromellitic dianhydride. The product was soluble in chlorinated aliphatic hydrocarbons, methyl ethyl ketone, butyl acetate, and 85 toluene-15 ethyl alcohol. The polyester had excellent adhesion on the following substrates: poly(methylmethacrylate); polystyrene; the polyether of 2,6-dimethylphenol; a polysulfone; polyformaldehyde; a polyester made from terephthalic acid and Bisphenol A; polyacrylonitrile; metals such as iron, aluminum, copper, brass, zinc, nickel, and chromium. The various types of coatings listed in Example 3 had good adhesion on surfaces primed with the polyester.

Carboxylated polyesters having excellent adhesion were obtained when the following dianhydrides were used in place of pyromellitic dianhydride: 1,2,4,5-tetracarboxycyclohexane dianhydride; 1,2,3,4-tetracarboxybutane dianhydride; 3,4,3',4'-benzophenonetetracarboxylic acid dianhydride; tetracarboxycyclopentane dianhydride; naphthalene-1,4,5,8-tetracarboxylic acid dianhydride and the following formula:

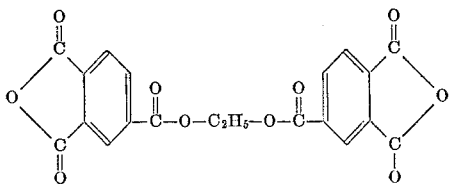

EXAMPLE 5

This example shows the effect of the free carboxyl groups on adhesion.

A polyester was made having the composition 0.5 mole terephthalic acid, 0.5 mole 1,3-cyclohexanedicarboxylic acid, and 2,2-dimethyl-1,3-propanediol. It was dissolved in chloroform and the solution was coated on iron and aluminum. The coatings were easily removed by the tape test.

Another polyester was made from the same reagents as described above. It was terminated by hydroxyl groups and had a molecular weight of about 1,600. It was reacted with an equivalent amount of pyromellitic dianhydride to produce the carboxylated linear polymer. Coatings made with this composition on aluminum and steel were not removed by the tape test. Since the polyesters had substantially the same viscosity and were similar in composition except for the carboxyl groups, the results demonstrate that the free carboxyl groups impart greatly improved adhesion.

EXAMPLE 6

This example illustrates the preparation and use of a carboxylated polyester containing an unsaturated acid. This type is curable to a cross-linked, insoluble structure.

A polyester was made from 0.3 mole 1,4-cyclohexanedimethanol, 0.1 mole maleic anhydride, and 0.15 mole phthalic anhydride. Twenty-three grams of the polyester were heated with 3.5 grams of pyromellitic dianhydride in 20 ml. of cyclohexanone at 80°–90° for 6 hours and at 140° for 1 hour. A trace of pyridine was used as catalyst. The product was precipitated by pouring the solution into methanol.

The unsaturated carboxylated polyester was dissolved in chloroform and a trace of cobalt naphthenate curing catalyst was added. Coatings were made on copper, iron, aluminum, steel, nylon, poly(ethylene terephthalate), wood, and cellulose triacetate. The coatings were heated at 120°–130° for 15–30 minutes to cure the unsaturated polyester. The adhesion was excellent in all cases.

This cured polyester coat is especially valuable as a primer for lacquer top coats because it is not affected by solvents. For example, a solution of cellulose acetate butyrate in toluene-alcohol mixture was sprayed onto the priming coat. It had excellent adhesion. Similar adhesion was obtained with acrylic lacquers, vinyl chloride polymers, alkyd resins, and bis-phenol polycarbonates when they were applied on the cured priming coat.

This curable primer is valuable in fluidized bed processes where resistance to heat is important.

EXAMPLE 7

One molecular proportion of polypropylene glycol having a molecular weight of 400 was heated with one molecular proportion of 3,4,3',4'-diphenyl tetracarboxylic acid dianhydride. The product has excellent adhesion on steel, aluminum, copper, and zinc. It was useful as a primer.

EXAMPLE 8

A polyester was made from 1 mole of dimer acid, 3 moles of maleic anhydride, and 5 moles of p-xylylene glycol. It was reacted wtih 0.8 mole of

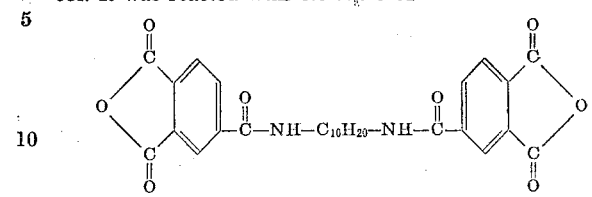

Coatings were made on steel, aluminum, copper, brass, zinc, nylon, polyformaldehyde, and poly(ethylene terephthalate). The coatings contained a trace of cobalt and manganese salts as curing catalysts. After baking at 90°–120° for 20–40 minutes, the coatings had excellent adhesion.

The following top coats were applied on the primer: cellulose acetate butyrate, polystyrene, vinyl chloride-vinyl acetate copolymer, Bisphenol A polycarbonate, poly(vinylbutyral), and poly(methylmethacrylate). The adhesion was excellent in all cases.

EXAMPLE 9

A polyester was made from 1 mole of 6-hydroxyhexanoic acid, 1 mole of 1,4-cyclohexanedicarboxylic acid and 1 mole of 1,2-propylene glycol. The molecular weight was about 6,000 and the terminal groups were hydroxyl. The polyester (600 g.) was reacted with 22 grams of pyromellitic dianhydride.

Ten gram portions of the carboxylated polyester were mixed in solution with the following cross-linking agents: 1 gram of Bisphenol A bisglycidyl ether; 2 grams of Epon 828 epoxy resin; 0.5 gram of 2,4-tolylenediisocyanate; 1.0 gram of methylated trimethylolmelamine; 0.5 gram of soluble, reactive urea-formaldehyde resin; and 2.0 grams of soluble, reactive phenol-formaldehyde resin. Coatings were made on iron, copper, brass, aluminum, wood, and nylon. The coatings were heated at 90°–150°, depending upon the particular cross-linking agent. Adhesion was excellent in all cases. Top coats applied to the primed surfaces had excellent adhesion. For example, cellulose ester and acrylic lacquers were used.

EXAMPLE 10

The carboxylated polyester of Example 1 was coated on films of gelatin and poly(vinyl alcohol). Top coats of cellulose acetate and vinyl chloride copolymers had excellent adhesion on the primed surface.

Films of cellulose acetate, vinyl chloride copolymers and bisphenol polycarbonates were primed with the carboxylated polyester. Top coats of gelatin and poly(vinyl alcohol) had excellent adhesion when applied.

Although the invention has been described in considerable detail with reference to certain preferred embodiments thereof, it will be understood that variations and modifications can be effected within the spirit and scope of this invention as described hereinabove.

I claim:

1. A prime-coated article of manufacture comprising a substrate having coated thereon a prime coating comprising a carboxylated polyester consisting essentially of repeating units of the formula:

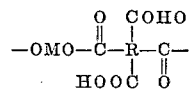

containing about 1.2 to about 15 weight percent free carboxyl groups in which R is a tetravalent organic group free of olefinic unsaturation containing 4 to about 40 carbon atoms and in which M is a divalent organic radical corresponding to the residue of a hydroxyl-terminated polymer free of olefinic unsaturation having a molecular weight of about 400 to about 8000 and selected from:
(a) a hydroxyl-terminated polyester or
(b) a poly(ether glycol).

2. An article of manufacture according to claim 1 in which the hydroxyl-terminated polymer to which the residue M corresponds is a hydroxyl-terminated polyester.

3. An article of manufacture according to claim 2 in which the glycol component of said hydroxyl-terminated polyester corresponds to at least one aliphatic glycol having 2 to about 20 carbon atoms.

4. An article of manufacture according to claim 3 in which the aliphatic glycol of 2 to about 20 carbon atoms is selected from:
(a) tetramethylene glycol
(b) 2,2,4,4-tetramethyl-1,3-cyclobutanediol
(c) 1,4-cyclohexanedimethanol
(d) 2,2-dimethyl-1,3-propanediol
(e) 1,2-propylene glycol or
(f) ethylene glycol.

5. An article of manufacture according to claim 2 in which the dicarboxylic acid component of said hydroxyl-terminated polyester corresponds to at least one aliphatic dicarboxylic acid of 3 to 20 carbon atoms.

6. An article of manufacture according to claim 5 in which the dicarboxylic acid of 3 to 20 carbon atoms is selected from:
(a) adipic acid
(b) 1,4-cyclohexanedicarboxylic acid or
(c) 1,3-cyclohexanedicarboxylic acid.

7. An article of manufacture according to claim 2 in which the dicarboxylic acid component of said hydroxyl-terminated polyester corresponds to at least one aromatic dicarboxylic acid of 8 to 14 carbon atoms.

8. An article of manufacture according to claim 7 in which the aromatic dicarboxylic acid is selected from:
(a) terephthalic acid
(b) isophthalic acid or
(c) phthalic acid.

9. An article of manufacture according to claim 1 in which the hydroxyl-terminated polymer to which the residue M corresponds is a hydroxyl-terminated poly(ether glycol) in which the ether linkages are separated by from 2 to about 4 carbon atoms.

10. An article of manufacture according to claim 9 in which the hydroxyl-terminated poly(ether glycol) is selected from:
(a) polyethylene glycol
(b) polypropylene glycol or
(c) polytetramethylene glycol.

11. An article of manufacture according to claim 1 in which the tetracarboxylic acid dianhydride to which the residue R corresponds has the formula:

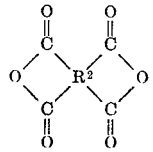

or, the formula:

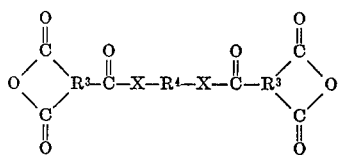

in which $R^2$ is a tetravalent organic radical of 4 to 15 carbon atoms; $R^3$ is a trivalent carbocyclic radical of 6 carbon atoms; $R^4$ is a divalent aliphatic radical of 2 to 8 carbon atoms and X is oxygen or imino.

12. An article of manufacture according to claim 11 in which the tetracarboxylic acid dianhydride is selected from:
(a) pyromellitic acid dianhydride
(b) 1,2,4,5,tetracarboxycyclohexane dianhydride
(c) 1,2,3,4-tetracarboxybutane dianhydride
(d) tetracarboxycyclopentane dianhydride
(e) naphthalene-1,4,5,8-tetracarboxylic acid dianhydride
(f) 3,4,3',4'-benzophenonetetracarboxylic acid dianhydride
(g) the tetracarboxylic acid dianhydride of the formula:

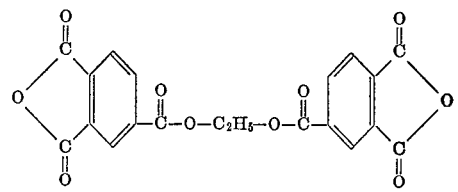

13. An article of manufacture according to claim 1 in which the tetracarboxylic acid dianhydride to which the tetravalent organic group R corresponds is selected from:
(a) pyromellitic acid dianhydride
(b) 1,2,4,5-tetracarboxycyclohexanedianhydride
(c) 1,2,3,4-tetracarboxybutane dianhydride
(d) tetracarboxycyclopentane dianhydride
(e) naphthalene-1,4,5,8-tetracarboxylic acid dianhydride
(f) 3,4,3',4'-benzophenonetetracarboxylic acid dianhydride
(g) the tetracarboxylic acid dianhydride of the formula:

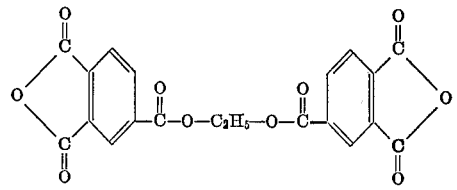

14. A prime-coated article of manufacture according to claim 13 in which the substrate is selected from metal, wood, paper, cellulose ethers, cellulose esters, or synthetic polymeric materials.

15. An article of manufacture according to claim 14 in which there is top coated upon said prime coating a material which is different from said substrate and which is selected from cellulose esters, cellulose ethers, vinyl polymers, acrylic polymers, polyesters, polycarbonates, polyolefins, styrene polymers, polyamides, polyesteramides, polyureas, polyurethanes, poly(phenylene oxides) polysulfones, polyethers, polyacetals, or waxes.

References Cited

UNITED STATES PATENTS 2,865,788  12/1958  Nischk et al.
3,108,902  10/1963  Galli et al.
3,225,065  12/1965  Hyde _____ 260—75 X WILLIAM D. MARTIN, Primary Examiner R. HUSACK, Assistant Examiner U.S. Cl. X.R.

117—73, 74, 75, 76, 92, 132, 138, 145, 148, 155, 161; 260—75

UNITED STATES PATENT OFFICE
CERTIFICATE OF CORRECTION

Patent No. 3,459,584     Dated August 5, 1969

Inventor(s) John R. Caldwell

It is certified that error appears in the above-identified patent and that said Letters Patent are hereby corrected as shown below:

Column 2, line 18, "$R_3$" should read ---$R^2$---. Column 2, line 19, "$R_2$" should read ---$R^3$---. Column 2, line 20, "$R_3$" should read ---$R^4$---. In the formula just above line 18, the "$R_3$" appearing in the first ring should be ---$R^3$---. In Claim 1, the formula should read:

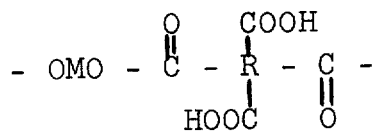

SIGNED AND
SEALED
JAN 20 1970

(SEAL)
Attest:

Edward M. Fletcher, Jr.
Attesting Officer

WILLIAM E. SCHUYLER, JR.
Commissioner of Patents